United States Patent
Whitby (10) Patent No.: US 10,487,950 B2
(45) Date of Patent: Nov. 26, 2019

(54) BLOWOUT PREVENTER HAVING ROTATION-OPERATED PORTION

(71) Applicant: Cameron International Corporation, Houston, TX (US)

(72) Inventor: Melvyn Whitby, Houston, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 90 days.

(21) Appl. No.: 15/612,158

(22) Filed: Jun. 2, 2017

(65) Prior Publication Data
US 2018/0347710 A1    Dec. 6, 2018

(51) Int. Cl.
*F16K 5/06* (2006.01)
*E21B 33/06* (2006.01)

(52) U.S. Cl.
CPC .......... *F16K 5/0605* (2013.01); *E21B 33/061* (2013.01); *E21B 33/062* (2013.01)

(58) Field of Classification Search
None
See application file for complete search history.

(56) References Cited

U.S. PATENT DOCUMENTS

| | | | |
|---|---|---|---|
| 7,086,467 B2 | 8/2006 | Schlegelmilch et al. | |
| 2006/0254822 A1* | 11/2006 | Ayling | E21B 19/16 175/57 |
| 2010/0152901 A1* | 6/2010 | Judge | E21B 33/062 700/275 |
| 2013/0327536 A1 | 12/2013 | Elexander et al. | |
| 2014/0209314 A1 | 7/2014 | Guven | |
| 2015/0159459 A1 | 6/2015 | Liotta et al. | |
| 2016/0102519 A1 | 4/2016 | Molaschi | |
| 2017/0130549 A1* | 5/2017 | Kroesen | E21B 33/063 |

OTHER PUBLICATIONS

Wireline Shear and Seal Valve, Section 3 WPCE Wireline Presure Control, NOV Elmar, www.nov.com/Elmar 2014 National Oilwell Varco.
International Search Report and Written Opinion for the equivalent International patent application PCT/US2018/034979 dated Sep. 4, 2018.

* cited by examiner

*Primary Examiner* — Jessica Cahill
*Assistant Examiner* — Daphne M Barry
(74) *Attorney, Agent, or Firm* — Helene Raybaud (57) ABSTRACT

A system has a blowout preventer (BOP) assembly with first and second BOP portions. The first BOP portion has one or more rams configured to move between a first open position and a first closed position relative to a central bore. The second BOP portion has an inner cylinder with a bore, wherein the inner cylinder is configured to rotate about an axis crosswise to the central bore to move between a second open position with the bore aligned with the central bore and a second closed position with the bore out of alignment with the central bore.

18 Claims, 7 Drawing Sheets

BLOWOUT PREVENTER HAVING ROTATION-OPERATED PORTION

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

A blowout preventer (BOP) stack may be installed on a wellhead to seal and control an oil and gas well during drilling operations. A tubular string may be suspended inside a drilling riser and extend through the BOP stack into the wellhead. During drilling operations, a drilling fluid may be delivered through the tubular string and returned through a bore between the tubular string and a casing of the drilling riser. In the event of a rapid invasion of formation fluid in the bore, commonly known as a "kick," the BOP stack (e.g., one or more rams) may be actuated to seal the bore and to control a fluid pressure in the bore, thereby protecting well equipment disposed above the BOP stack. In operation, opposite rams may be driven linearly toward one another to seal the bore. Unfortunately, the rams may have certain drawbacks associated with their linear actuation (such as sealing the bore in only one direction below the rams).

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure relate to a BOP system that includes one or more BOP assemblies or modules, each having both a first radial-operated BOP portion and a second rotation-operated BOP portion, such that the BOP assembly can open, close, and seal a main wellbore via either radial operation (e.g., radially movable rams) and/or rotational operation (e.g., rotation of a rotatable member or valve). In certain embodiments, the first and second BOP portions may be disposed in a nested or concentric configuration, such as the radially movable rams of the first radial-operated BOP portion disposed in a slot or a cavity of the rotatable member of the second rotation-operated BOP portion. In this manner, the BOP may be substantially compact and configured to close off and seal the main wellbore in substantially the same location using either rotation and/or linear movement (e.g., in a radial direction) relative to a central axis of the main wellbore. For example, a first control system may be coupled to one or more first actuators (e.g., electric or hydraulic drives) that move opposite first and second rams linearly (e.g., radially) toward and away from one another through the slot in the rotatable member, thereby opening and closing the main wellbore depending on conditions (e.g., close the wellbore if sensor indicates a potential or existing blowout condition). By further example, a second control system may be coupled to one or more second actuators (e.g., electric or hydraulic drives) that rotate the rotatable member (e.g., inner cylinder having a bore crosswise to its axis of rotation), thereby opening and closing the main wellbore by positioning the bore into alignment or out of alignment with the main wellbore). In this manner, the BOP assembly is configured to open and close the main wellbore using either linear actuation forces and linear movement of the first and second rams, or rotational actuation forces (or torque) and rotational movement of the rotatable member, or a combination thereof.

As discussed in further detail below, the second rotation-operated BOP portion may include a rotatable member (e.g., an inner cylinder disposed within an outer, cylindrical housing) that enables the main wellbore to be sealed both above and below the BOP assembly (e.g., bidirectionally) to enhance a seal of the main wellbore when blowout conditions are detected or for testing purposes when a wellhead is inert. In other words, the rotatable member (e.g., the inner cylinder) enables the wellbore to be sealed above the BOP assembly or below the BOP assembly, compared to conventional BOPs that may only allow the wellbore to be sealed below the BOP assembly. The disclosed BOP assembly may be included in above surface or below surface drilling operations through a drilling riser may be subject to fluid related pressure changes that result in uncontrolled pressure surges. For example, pressures may fluctuate within a natural reservoir, which may lead to a surge in fluid flow through the drilling riser when the pressure reaches a certain value. To block fluid from flowing toward the drilling platform during blowout conditions, the BOP assembly may be actuated to cut a wireline or tubular string and seal the drilling riser by blocking a bore in the BOP assembly.

Figure 1:
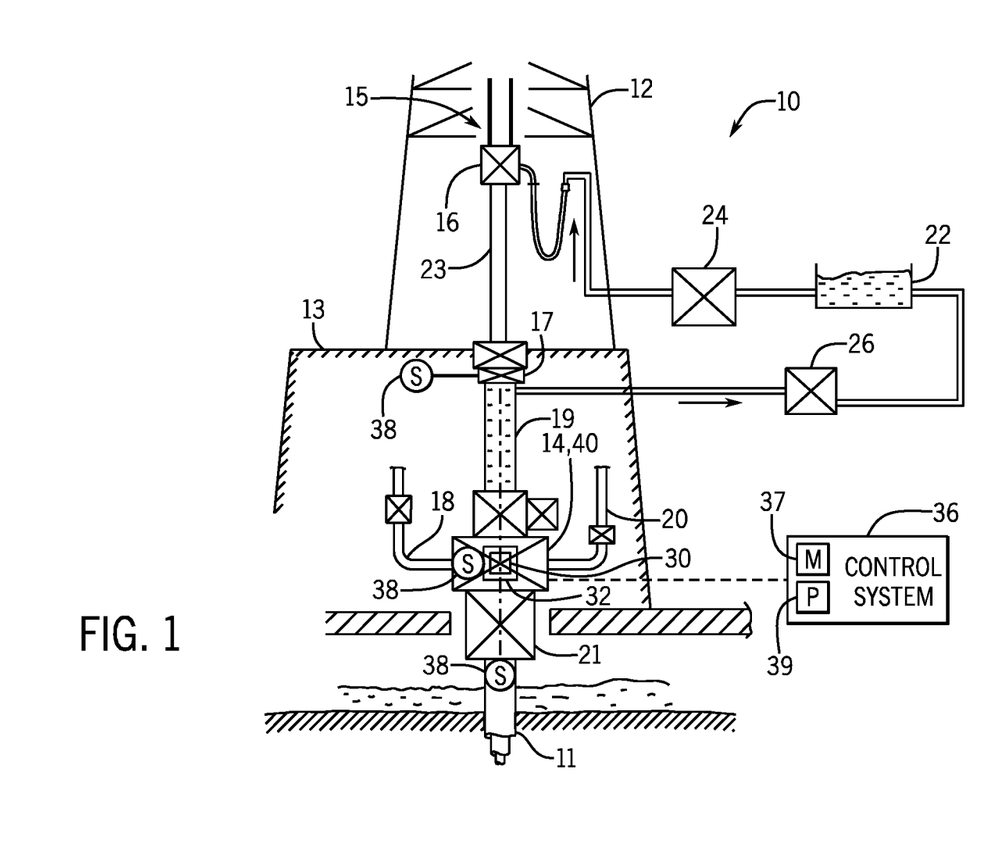
FIG. 1 is a schematic of an embodiment of a mineral extraction system with a BOP stack including multiple BOP assemblies, where at least one BOP assembly includes a first radial-operated BOP portion having one or more rams and a second rotation-operated BOP portion having a rotatable member with a bore.

With the foregoing in mind, FIG. 1 is a schematic diagram showing multiple BOP assemblies 14 positioned within a BOP stack 16 within a mineral extraction system 10 (e.g., hydrocarbon extraction, drilling, and/or production system), wherein each BOP assembly 14 has a first radial-operated BOP portion 30 and a second rotation-operated BOP portion 32 in accordance with an embodiment of the present disclosure. As shown, the system 10 includes a mast 12 (e.g., derrick) positioned on a drill floor 13. The system 10 may include a hoisting system 15 having a kelly or top drive 17. The hoisting system 15 may be used to raise and to lower drilling equipment relative to the drill floor 13, and the top drive 17 may be used to support and/or to rotate the drilling equipment. As shown, a drill pipe 23 (e.g., drill string) is suspended from the top drive 17 and extends through the drill floor 13 into a wellbore 11. The system 10 may include various other components, such as a diverter (or rotating control device in a managed pressure drilling system), one or more ram and/or annular BOPs disposed in the blowout preventer (BOP) assembly 14, a bell nipple 19 (e.g., annular pipe), and a wellhead 21. As shown, a choke line 18 and a kill line 20 extend from the BOP assembly 14 to direct fluid to a fluid processing system at the drill floor 13 or other location.

During drilling operations, the top drive 17 may rotate the drill pipe 23 to facilitate drilling the wellbore 11 and drilling mud may be pumped from a mud tank 22 (e.g., storage tank) through the drill pipe 23 toward the wellbore 11 via a mud pump 24. The drilling mud may return toward the drill floor via an annular space between the drill pipe 23 and the bell nipple 19. The diverter 17 may divert the drilling mud toward a mud processing device 26 (e.g., shale shaker), which may separate debris or particulate matter from the drilling mud prior to returning the drilling mud to the mud tank 22.

In operation, the wellhead 21 enables completion and workover procedures. Minerals extracted from a formation (e.g., hydrocarbons in the form of oil and natural gas) may be regulated and routed via the wellhead 21. For example, the blowout preventer (BOP) 14 may include a variety of valves, fittings, and controls to prevent oil, gas, or other fluid via an unintentional release of pressure or an overpressure condition.

In certain embodiments, a control system 36 may be used to control actuation and positioning of the first radial-operated BOP portion 30 (e.g., first and second rams) and the second rotation-operated BOP portion 32 (e.g., rotatable member, sleeve, or inner cylinder 40) as described in detail below. The control system 36, including a memory 37 and a processor 39, may receive sensor data or characteristics of the fluid (e.g., drilling mud, production fluid, etc.) obtained by one or more sensors 38 disposed throughout the system 10 to control a position of the first radial-operated BOP portion 30 (e.g., first and second rams) and the second rotation-operated BOP portion 32 (e.g., rotatable member, sleeve, or inner cylinder 40) of the BOP assembly 14, as described in detail below. As discussed in more detail below, in certain embodiments, the control system 36 may be part of a distributed controller or control system with one or more controllers (e.g., electronic controllers with processors, memory, and instructions) distributed about the system 10 or the production system and in communication with one another to receive and/or to process the signals from one or more components of the system 10, to provide an output, and/or to control the components of the BOP assembly 14 (e.g., first and second BOP portions 30 and 32).

Figure 2:
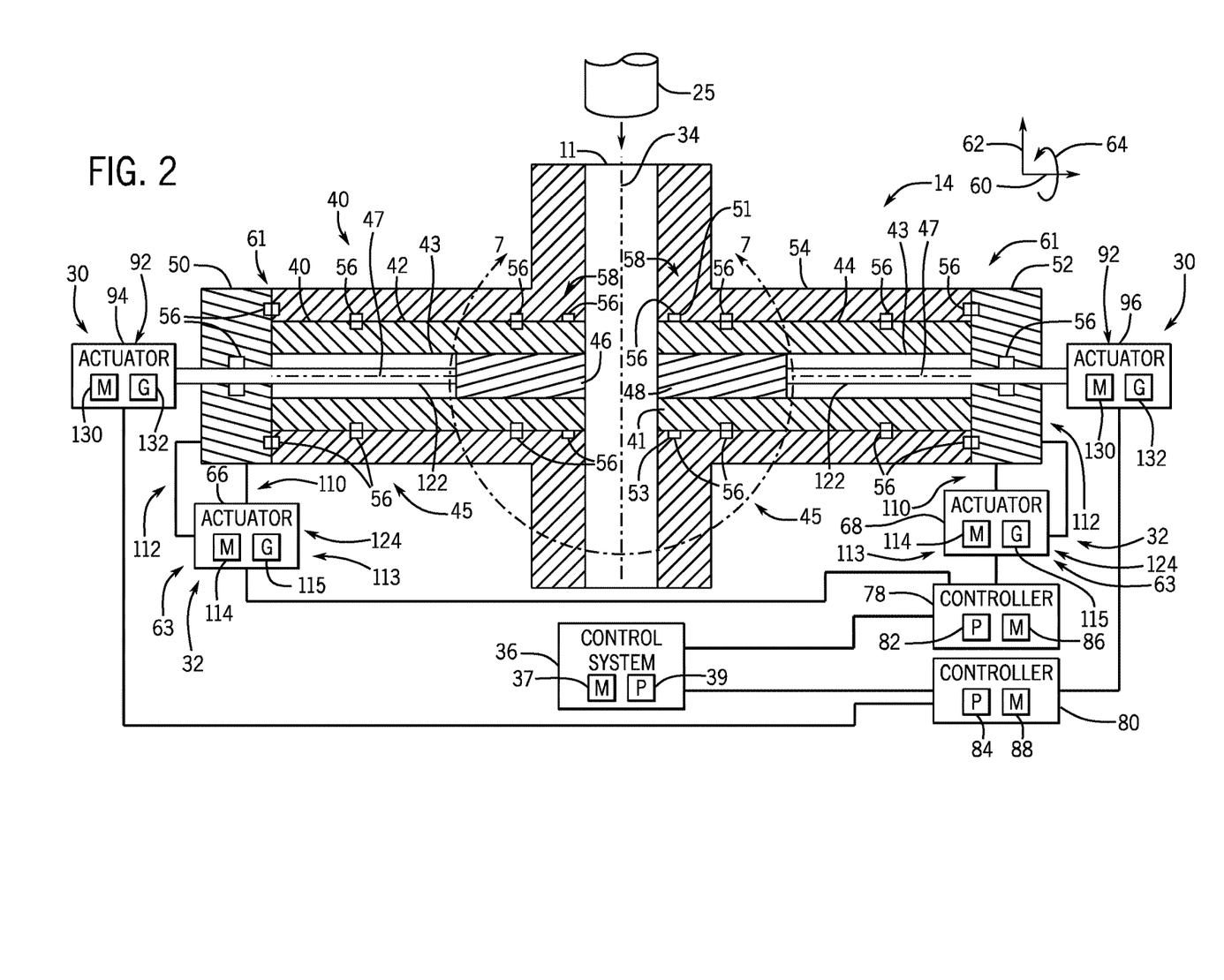
FIG. 2 is a schematic side view of an embodiment of the BOP assembly of FIG. 1, illustrating a nested configuration of the first radial-operated BOP portion disposed in the rotatable member of the second rotation-operated BOP portion.

FIG. 2 is a schematic side view of an embodiment of the BOP assembly 14, illustrating details of the first radial-operated BOP portion 30 (e.g., first and second rams 45, 46, 48) and the second rotation-operated BOP portion 32 (e.g., rotatable member, sleeve, or inner cylinder 40). In the illustrated embodiment, the first and second BOP portions 30 and 32 are disposed in a nested configuration (e.g., one inside the other), thereby reducing the size or footprint of the overall BOP assembly 14 and enabling selective opening and closing of the wellbore 11 using linear actuation and/or rotational actuation at substantially the same location along the wellbore 11.

The second rotation-operated BOP portion 32 has a variety of elements configured to enable a rotational actuation force (e.g., torque) to drive opening and closing of the wellbore 11. For example, the second rotation-operated BOP portion 32 includes the inner cylinder 40 coupled to one or more actuators 63 (e.g., first and second actuators 66 and 68), which provide torque to rotate the inner cylinder 40. The actuators 63 (e.g., 66, 68) may include electric actuators (e.g., electric drives or motors), fluid-driven actuators (e.g., hydraulic or pneumatic actuators), mechanical actuators (e.g., manual actuators, spring-loaded actuators, etc.), or any combination thereof. The actuators 63 (e.g., 66, 68) may also be described as or include rotational actuators, torque actuators, or any combination thereof. The inner cylinder 40 includes a first cylinder portion 42 and a second cylinder portion 44. The inner cylinder 40 may be a single, continuously one-piece structure forming the first and second cylinder portions 42 and 44, or the inner cylinder 40 may have the first and second cylinder portions 42 coupled together (e.g., fixed together or removably coupled by threads, fasteners, etc.) The inner cylinder 40 includes a bore 41 and a ram passage, opening, or slot 43. The bore 41 extends crosswise (e.g., perpendicular) to a longitudinal axis 47 of the inner cylinder 40, whereas the ram slot 43 extends lengthwise along (e.g., parallel to) the longitudinal axis of the inner cylinder 40. As discussed in further detail below, the second rotation-operated BOP portion 32 is configured to control the one or more actuators 63 to drive rotation of the inner cylinder 40 to selectively move the bore 41 into and out of alignment with the wellbore 11, thereby opening and closing the wellbore 11 via rotation rather than linear movement. If any structure is disposed in the wellbore 11 (e.g., tubing, drilling string, etc.) and the bore 41, then the inner cylinder 40 may shear through the structure in response to the torque applied by the one or more actuators 63 during rotational movement from the open position to the closed position of the inner cylinder 40. In certain embodiments, the inner cylinder 40 may be used when the wellbore 11 has nothing disposed within the wellbore 11 or when a structure 25 (e.g., tubing or drilling string) or other component is disposed within the wellbore 11. The inner cylinder 40 may shear through the tubing 25 or other components when the inner cylinder 40 rotates via a modified edge (e.g., modified via material selection, via sheared edge, etc.).

The first radial-operated BOP portion 30 has a variety of elements configured to enable a linear actuation force (e.g., axial driving force) to drive opening and closing of the wellbore 11. For example, the first radial-operated BOP portion 30 includes one or more actuators 92 (e.g., first and second actuators 94 and 96), which provide a linear force to drive linear movement of one or more rams 45 (e.g., first and second rams 46 and 48). The actuators 92 (e.g., 94, 96) may include electric actuators (e.g., electric drives or motors), fluid-driven actuators (e.g., hydraulic or pneumatic actuators), mechanical actuators (e.g., manual actuators, spring-loaded actuators, etc.), or any combination thereof. The actuators 92 (e.g., 94, 96) may also be described as or include linear actuators, radial actuators (e.g., radial direction toward central axis 34 of wellbore 11), axial actuators (e.g., axial direction along longitudinal axis 47 of inner cylinder 40), or any combination thereof. In certain embodiments, the one or more rams 45 may include one or more pairs of opposing rams 45 (e.g., first and second opposing rams 46 and 48), which are configured to move in a radial direction toward and away from one another relative to the central axis 34 of the wellbore 11.

As noted above, the first and second BOP portions 30 and 32 may be disposed in a nested configuration (e.g., one inside the other). In the illustrated embodiment, the first radial-operated BOP portion 30 is disposed at least partially within the second rotation-operated BOP portion 32. In particular, the first and second rams 46 and 48 of the first radial-operated BOP portion 30 extend lengthwise along the ram slot 43 in the inner cylinder 40 of the second rotation-operated BOP portion 32. As illustrated, the first ram 46 is disposed within the ram slot 43 (e.g., a first ram slot portion) in the first cylinder portion 42, while the second ram 48 is disposed within the ram slot 43 (e.g., a second ram slot portion or a cavity portion) in the second cylinder portion 44. The first cylinder portion 42 and the second cylinder portion 44 may be coupled to a first cap assembly 50 and a second cap assembly 52, respectively. The first cap assembly 50 and the second cap assembly 52 may be removably coupled (e.g., coupled via threads, bolts, latches, clamps, or fasteners) to an outer housing 54 of the BOP assembly 14.

The BOP assembly 14 may include a plurality of seals configured to seal the first and second BOP portions 30 and 32 relative to one another, the outer housing 54, the first and second cap assemblies 50 and 52, or a combination thereof. In the illustrated embodiment, one or more sealing elements 56 (e.g., annular seals or O-rings) are disposed between the inner cylinder 40 and the outer housing 54. The sealing elements 56 may be disposed along and/or recessed into the radially 62 outer surface of inner cylinder 40 (e.g., on the radially 62 outer surface of the first cylinder portion 42 and/or the second cylinder portion 44), and along and/or recessed into the inner surface of the outer housing 54. Any suitable number of sealing elements 56 (e.g., 1, 2, 3, 4, 5, 6, 7, 8, 9, 10, 11, 12, 13, 14, 15, 16, 17, 18, 19, 20, 21, 22, 23, 24, 25 or more) may be provided along the interface (e.g., annular interface) between the inner cylinder 40 and the outer housing 54. It may be appreciated that the sealing elements 56 may be concentrated in an area of the outer surface of the inner cylinder 40 to form specific sealing areas or the sealing elements 56 may be arranged in other suitable patterns (e.g., non-uniform spacing). In the illustrated embodiment, the sealing elements 56 (e.g., annular seals or O-rings) located in a position 58 near the main bore 11 may be disposed circumferentially around the central axis 34 and the bore 11 and seal against leakage from the main bore 11. The sealing elements 56 disposed around the inner cylinder 40 may be disposed circumferentially 64 around the inner cylinder 40 to block against leakage from the main bore 11 or the bore 41 of the inner cylinder 40. One or more sealing elements 56 may be disposed near or within the cap assemblies (e.g., the first cap assembly 50, the second cap assembly 52). For example, one or more sealing elements 56 may be disposed between an end portion 61 of the inner cylinder 40 and the cap assembly (e.g., the first end cap assembly 50, the second end cap assembly 52). In the illustrated embodiment, the sealing elements 56 are disposed around a drive rod or shaft 122 that drives the rams 46, 48.

Each of the sealing elements 56 may be disposed in a groove 49 along an interface (e.g., sealing interface) between the adjacent components, e.g., between the inner cylinder 40 and the outer housing 54, between the inner cylinder 40 and the cap assemblies 50 and 52, or a combination thereof. Along each sealing interface, the groove 49 may include opposite first and second groove portions, e.g., a first groove portion in the inner cylinder 40 and a second groove portion in the outer housing 54, and a first groove portion in the inner cylinder 40 and a second groove portion in the cap assemblies 50 and 52. Each groove 49 (e.g., first and second groove portions) has a geometry to accept the sealing element 56, such as an annular geometry (e.g., annular sealing element 56 in an annular groove 49), a rectangular geometry, a generally curved closed loop geometry, etc. In one embodiment, the sealing elements 56 disposed in the position 58 near the main bore 11 may include an upper annular seal or O-ring 51 and a lower annular seal or O-ring 53, respectively. The sealing elements 56 may be made from any suitable materials, including metals, polymers, elastomeric materials, such as polyurethane, rubber, polytetrafluoroethylene (PTFE), or other suitable materials. The type of material that the sealing element is made from may be determined in part by the operating conditions and/or limits imposed due to fluid type, fluid pressure, fluid composition, compatibility, and/or fluid temperature. In the illustrated embodiments, the BOP assembly 14 excludes sealing elements 56 between the rams 45, 46, and 48 and the ram slot 43 within the inner cylinder 40. However, in some embodiments, one or more sealing elements 56 may be disposed along the interface between the rams 45, 46, and 48 and the ram slot 43. The illustrated sealing elements 56 are configured to seal the entire BOP assembly 14 relative to the main bore 11, while enabling linear movement of the rams 45, 46, and 48 along the longitudinal axis 47 through the ram slot 43 and enabling rotational movement of the inner cylinder 40 circumferentially about the longitudinal axis 47 within the outer housing 54.

The second rotation-operated BOP portion 32 is configured to transfer a torque from the actuator 63 (e.g., first and second actuators 66 and 68), through the first and second cap assemblies 50 and 52, and into the inner cylinder 40, thereby rotating the inner cylinder 40 and its bore 41 between an open position with the bore 41 aligned with the wellbore 11 and a closed position with the bore 41 out of alignment with the wellbore 11. The cap assemblies 50, 52 may be coupled to one or more of the components (e.g., an actuator 63, a drive system 113, a control system 78) to drive rotation of the inner cylinder 40, including the first cylinder portion 42 and the second cylinder portion 44, in the circumferential direction 64 about the longitudinal axis 47. In the illustrated embodiment, the first cap assembly 50 is driven to rotate by the actuator 63 (e.g., the first actuator 66) in the circumferential direction 64. Similarly, the second cap assembly 52 is driven to rotate by the actuator 63 (e.g., a second actuator 68) in the circumferential direction 64.

The control system 36 and/or the controller 78 is configured to control the actuators 63 (e.g., the first actuator 66 and the second actuator 68) to rotate the inner cylinder 40 relative to the outer housing 54 to selectively seal or open the wellbore 11. Again, the inner cylinder 40 includes the bore 41 that may be rotated to align with or rotate away from the main bore 11 (e.g., to block or enable flow). It may be appreciated that the inner cylinder 40 includes the first cylinder portion 42 and the second cylinder portion 44. The first cylinder portion 42 is coupled to the first actuator 66 and the second cylinder portion 44 is coupled to the second actuator 68. More specifically, the first actuator 66 is coupled to the first cap assembly 50, which is in turn coupled to the first cylinder portion 42 of the inner cylinder 40. Likewise, the second actuator 68 is coupled to the second cap assembly 52, which is in turn coupled to the second cylinder portion 44 of the inner cylinder 40. The first and second actuators 66 and 68 may be configured to interface with the respective first and second cap assemblies 50 and 52 in a radial direction or radial engagement configuration 110, an axial direction or axial engagement configuration 112, or a combination thereof. For example, the radial engagement configuration 110 may include an annular gear disposed circumferentially about an outer circumference of each of the respective cap assemblies 50 and 52, while a drive gear rotates along this annular gear in response to a driving force provided by the actuator 63 (e.g., 66 or 68). By further example, the axial engagement configuration 112 may include a disc-shaped gear interface along an axial end face of each of the respective cap assemblies 50 and 52, while a drive gear rotates along this disc-shaped gear interface in response to a driving force provided by the actuator 63 (e.g., 66 or 68). However, any suitable transmission of torque from the actuators 63 to the inner cylinder 40 may be employed within the scope of the illustrated embodiment.

The first actuator 66 and the second actuator 68 may be synchronized with one another. The actuators 63 may be part of an overall drive system 113 configured to drive rotation of the inner cylinder 40 in response to control by the control system 36 and/or the controller 78. Accordingly, the actuators 63 of the drive system 113 may include a drive or motor 114 coupled to a transmission or gear assembly 115. The drive system 113, which includes the actuators 63 and their motors 114 and gears 115, is configured to generate a rotational force or torque, which is used to drive rotation of the cap assemblies 50 and 52 and the inner cylinder 40. The drive system 113 (e.g., actuators 63 and their motors 114) may include a fluid (e.g., hydraulic or pneumatic) drive or motor, an electric drive or motor, a mechanical drive or motor (e.g., spring-loaded drive, manual drive such as a wheel), or any combination thereof. The motors 114 of the actuators 63 may transfer rotational or linear motion into rotational motion, axial motion, or a combination thereof, which in turn passes through the transmission or gear assembly 115 to the cap assemblies 50 and 52. In one example, the transmission or gear assembly 115 may include a threaded shaft, which threads into mating threads (e.g., threaded receptacle or bore) in the inner cylinder 40. In certain embodiments, the transmission may include a worm and worm gear assembly. Regardless of the particular configuration, the actuators 63 of the second rotation-operated BOP portion 32 are configured to transfer a torque through the first and second cap assemblies 50 and 52 and into the inner cylinder 40, thereby enabling the inner cylinder 40 to seal or unseal the wellbore 11 via a rotational motion or operation.

The BOP assembly 14 is also configured to seal or unseal the wellbore 11 via a linear motion or operation via the first radial-operated BOP portion 30. Accordingly, the control system 36 and/or the controller 80 is configured to control the one or more actuators 92 (e.g., first and second actuators 94 and 96) to provide a linear force to drive linear movement of one or more rams 45 (e.g., first and second rams 46 and 48) into and out of the wellbore 11 and the bore 41 of the inner cylinder 40 to close or open the wellbore 11. For example, the first ram 46 and the second ram 48 which are disposed within the ram slot 43 in the inner cylinder 40 may be driven by a first linear actuator 94 and a second linear actuator 96, respectively. As may be appreciated, the first ram 46 and the second ram 48 may be driven linearly in an axial direction 60 towards the main bore 11 to seal the wellbore 11, seal against a tubular or string in the wellbore 11, shear or cut a string or tubular in the wellbore 11, or any combination thereof. In the illustrated embodiment, a drive rod or shaft 122 extends through each of the cap assemblies 50 and 52 between the respective actuators 92 (e.g., first and second actuators 94 and 96) and the respective rams 45 (e.g., first and second rams 46 and 48). In operation, the actuators 92 are controlled by the controller 80 to drive the shafts 122 linearly in a sealed manner through the respective cap assemblies 50 and 52, thereby driving linear movement of the first and second rams 46 and 48 toward or away from one another and the central axis 34 of the wellbore 11.

In the illustrated embodiment, the actuators 92 (e.g., first and second actuators 94, 96) may include a drive or motor 130 and a transmission or gear assembly 132. Each drive or motor 130 may include a fluid (e.g., hydraulic or pneumatic) drive or motor, an electric drive or motor, a mechanical drive or motor (e.g., spring-loaded drive, manual drive such as a wheel), or any combination thereof. The motor 130 may be configured to provide a rotational motion or torque, which is then converted into a linear motion or force by the gear assembly 132. Alternatively or additionally, the motor may be configured to provide a linear motion or force, which is transferred or converted to an equal, greater, or lesser linear motion or force by the gear assembly 132. In turn, the gear assembly 132 may transfer the linear motion or force to the respective ram 45 (e.g., first or second ram 46, 48). Using this linear motion or force, the rams 45 (e.g., first and second rams 46, 48) are configured to move in a linear direction (e.g., along the axial direction 60) toward or away from one another and the wellbore 11. In some embodiments, the gear assembly 132 may include a reduction gearbox that is driven by a rotational input provided by the motor 130. For example, the rotational input from the motor 130 may turn a shaft that drives one or more reduction gear sets contained within the gear assembly 132.

In the illustrated embodiment, the actuators 63 (e.g., actuators 66 and 68) and the actuators 92 (e.g., actuators 94 and 96) may be communicatively coupled to one or more controls, such as the control system 36 (e.g., a centralized control system), the controller 78, and the controller 80. For example, the actuators 63 (e.g., actuators 66 and 68) may be coupled to the controller 78, which in turn couples to the control system 36. Likewise, the actuators 92 (e.g., actuators 94 and 96) may be coupled to the controller 78, which in turn couples to the control system 36. The control system 36 and controllers 78, 80 may receive signals from one or more sensors 38 disposed throughout the mineral extraction system 10 (see FIG. 1). The sensors 38 may include pressure sensors, temperature sensors, vibration sensors, material composition sensors, flow rate sensors, viscosity sensors, moisture content sensors, gas content sensors, or any combination thereof. The control system 36 and controllers 78, 80 may process the data from these sensors 38, compare the sensed data against thresholds (e.g., pressure above a pressure threshold), identify trends in the sensed data (e.g., rapid increase in pressure), or otherwise determine if a potential blowout condition is occurring or likely to occur (e.g., probability of blowout above some threshold probability). In response to such a blowout condition or other reasons, the control system 36 and controllers 78, 80 may control one or both of the first radial-operated BOP portion 30 and the second rotation-operated BOP portion 32 to close off and seal the wellbore 11.

The control system 36 and controllers 78, 80 each include one or more processors and memory to facilitate the processing of sensor 38 data, determination or prediction of a blowout condition, determination of other reasons for controlling the first and/or second BOP portions 30 and 32, and outputting appropriate control signals to actuate the first and/or second BOP portions 30 and 32. For example, the control system 36 includes memory 37 and one or more processors 39, the controller 78 includes one or more processors 82 and memory 86, and the controller 80 includes one or more processors 84 and memory 88. The processors (e.g., 39, 82, 84) may include one or more microprocessors, one or more "general-purpose" microprocessors, one or more special-purpose microprocessors, and/or one or more application specific integrated circuits (ASICS), system-on-chip (SoC) device, or some other processor configuration. For example, the processors (e.g., 39, 82, 84) may include one or more reduced instruction set (RISC) processors or complex instruction set (CISC) processors. The processors (e.g., 39, 82, 84) may execute computer instructions or non-transitory code. These instructions may be encoded in programs or code stored in a tangible non-transitory computer-readable medium, such as the memory (e.g., 37, 86, 88). The memory (e.g., 37, 86, 88) includes a computer readable medium, such as, without limitation, a hard disk drive, a solid state drive, diskette, flash drive, a compact disc, a digital video disc, random access memory (RAM and/or flash RAM), and/or any suitable storage device that enables the processors (e.g., 39, 82, 84) to store, retrieve, and/or execute instructions (e.g., software or firmware) and/or data (e.g., thresholds, ranges, etc.). The memory (e.g., 37, 86, 88) may include one or more local and/or remote storage devices.

Figure 3:
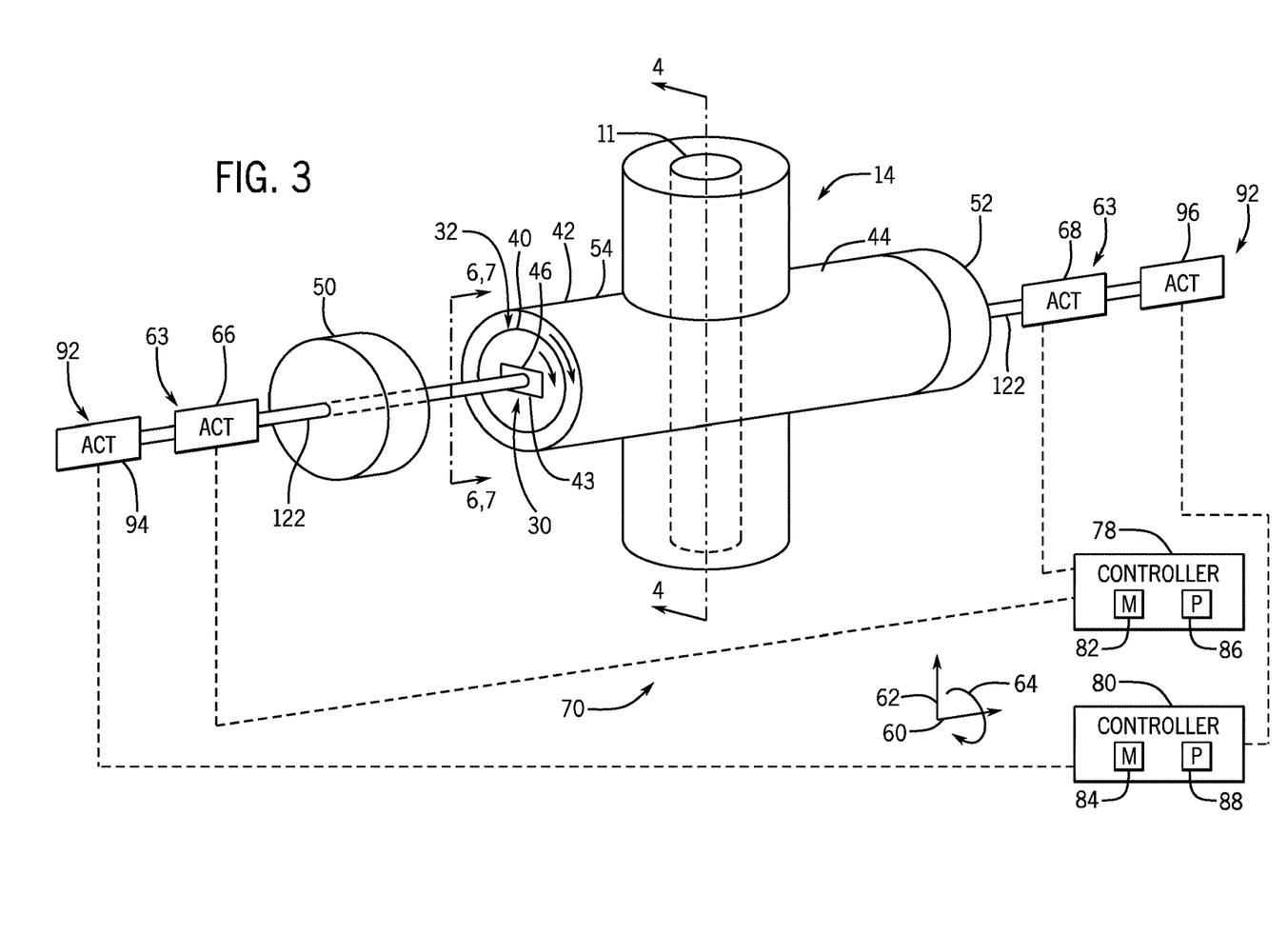
FIG. 3 is a perspective view of an embodiment of the BOP assembly of FIGS. 1 and 2, illustrating a first cap assembly removed from an outer housing, the rotatable member disposed in the housing, and a first ram of the first radial-operated BOP portion disposed in a ram slot in the rotatable member.

FIG. 3 is a perspective view of an embodiment of the first radial-operated BOP portion 30 and the second rotation-operated BOP portion 32 of the BOP assembly 14, illustrating the first cap assembly 50 exploded from the outer housing 54 to illustrating a connection between the actuators 63 (e.g., 66 and 68), the actuators 92 (e.g., 94 and 96), the shafts 122, the inner cylinder 40, and the rams 45 (e.g., 46 and 48). The first and second cylinder portions 42 and 44 of the inner cylinder 40 are disposed around the first and the second rams 46, 48, respectively. Likewise, first and second housing portions 55 and 57 of the outer housing 54 are disposed around the first and second cylinder portions 42 and 44, respectively. The outer housing 54 may remain stationary, while the inner cylinder 40 is configured to rotate in response to the actuators 63 (e.g., 66 and 68) between an open position 146 (see FIG. 4) with the bore 41 aligned with the wellbore 11 and a closed position 148 (see FIG. 5) with the bore 41 out of alignment (e.g., rotated 90 degrees away from) the wellbore 11. The angular range of rotation between the open position and closed position may be approximately 90 degrees; however, the angular range may be greater than, less than, or equal to approximately 30, 45, 60, 75, 90, 105, 120, or 135 degrees. Given that the rams 45 (e.g., 46 and 48) are disposed in the ram slot 43 of the inner cylinder 40 and have a non-circular geometry, the rams 45 also rotate along with the inner cylinder 40. In some embodiments, the rams 45 may have a circular geometry (e.g., cylindrical rams), such that the rams 45 may or may not rotate along with the inner cylinder 40. The outer housing 54 also may remain stationary, while the rams 45 (e.g., 46 and 48) are configured to move linearly in response to the actuators 92 (e.g., 94 and 96) between an open position 150 (see FIG. 6) with the rams 45 retracted out of the bore 41 and the wellbore 11 and a closed position 152 (see FIG. 7) with the rams 45 extending into and blocking the bore 41 and the wellbore 11. The rams 45 may be configured to move independent from the inner cylinder 40; therefore, the inner cylinder 40 may be stationary or moving during movement of the rams 45. In the illustrated embodiment, the actuators 63 and 92 are arranged in series and are configured to transfer both a rotational motion or torque and a linear motion or force through the same shafts 122 coupled to the rams 45 (e.g., rams 46 and 48). For example, the actuators 63 (e.g., 66 and 68) may be configured to apply torque to drive rotation of the shafts 122, which in turn causes rotation of the rams 45 (e.g., 46 and 48) in the ram slot 43. Given that the rams 45 and ram slot 43 are non-circular (e.g., rectangular), the rotation of the rams 45 causes rotation of the inner cylinder 40 between the open and closed positions. In other words, the non-circular interface between the rams 45 and the ram slot 43 may be described as a torque transfer interface. Additionally, the actuators 92 (e.g., 94 and 96) may be configured to apply a linear force to drive linear movement of the shafts 122, which in turn causes linear movement of the rams 45 (e.g., 46 and 48) in the ram slot 43 between the open and closed positions of the rams 45 relative to the bore 41 and the wellbore 11. Although the illustrated embodiment of the BOP assembly 14 has a series configuration of the actuators 63 and 92, the BOP assembly 14 may have a parallel configuration of the actuators 63 and 92 as shown in FIG. 2, or both a series configuration and a parallel configuration that combines the configurations of FIGS. 2 and 3.

Figure 4:
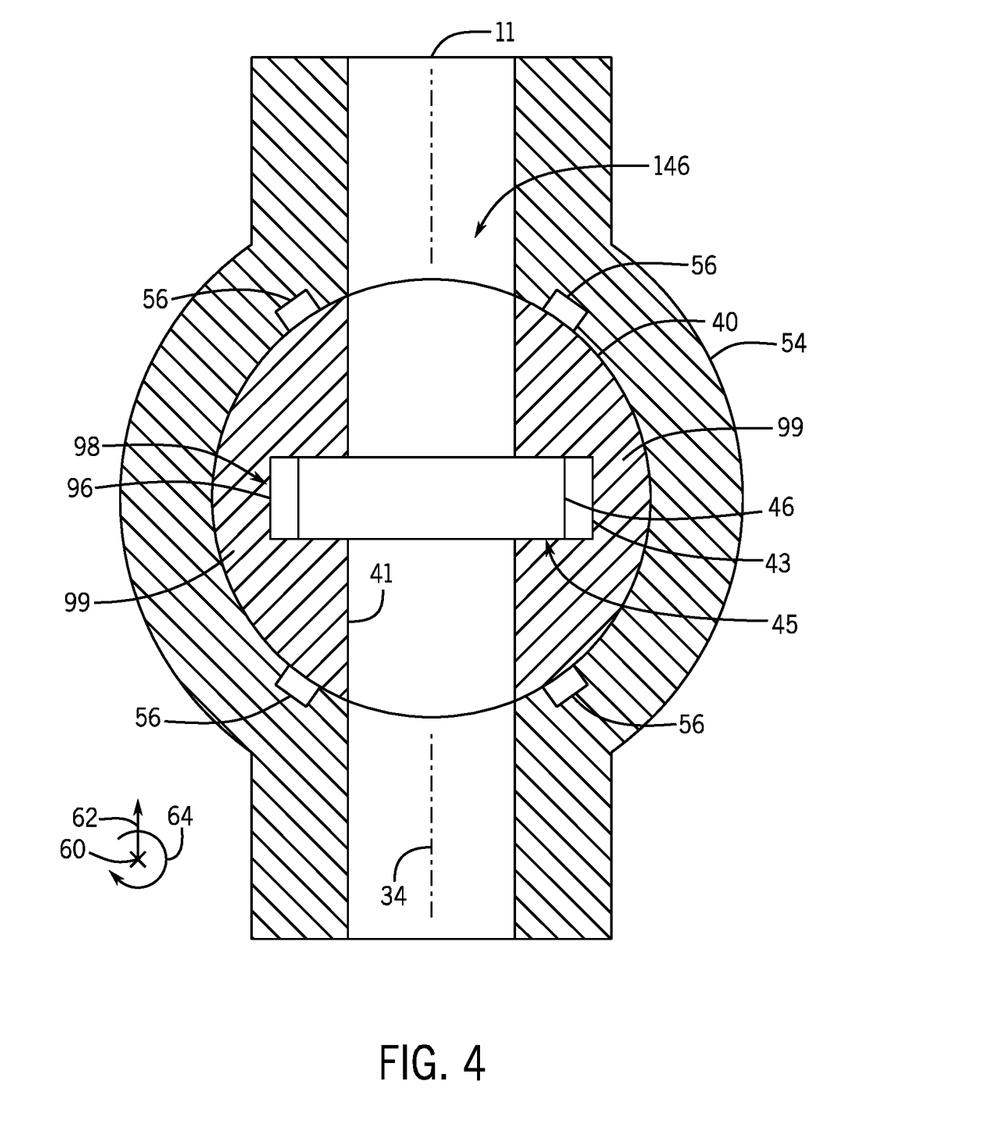
FIG. 4 is a cross-sectional view of an embodiment of the rotatable member along line 4-4 of FIG. 3, illustrating an open position of the second rotation-operated BOP portion with the bore of the rotatable member aligned with a main central bore.
Figure 5:
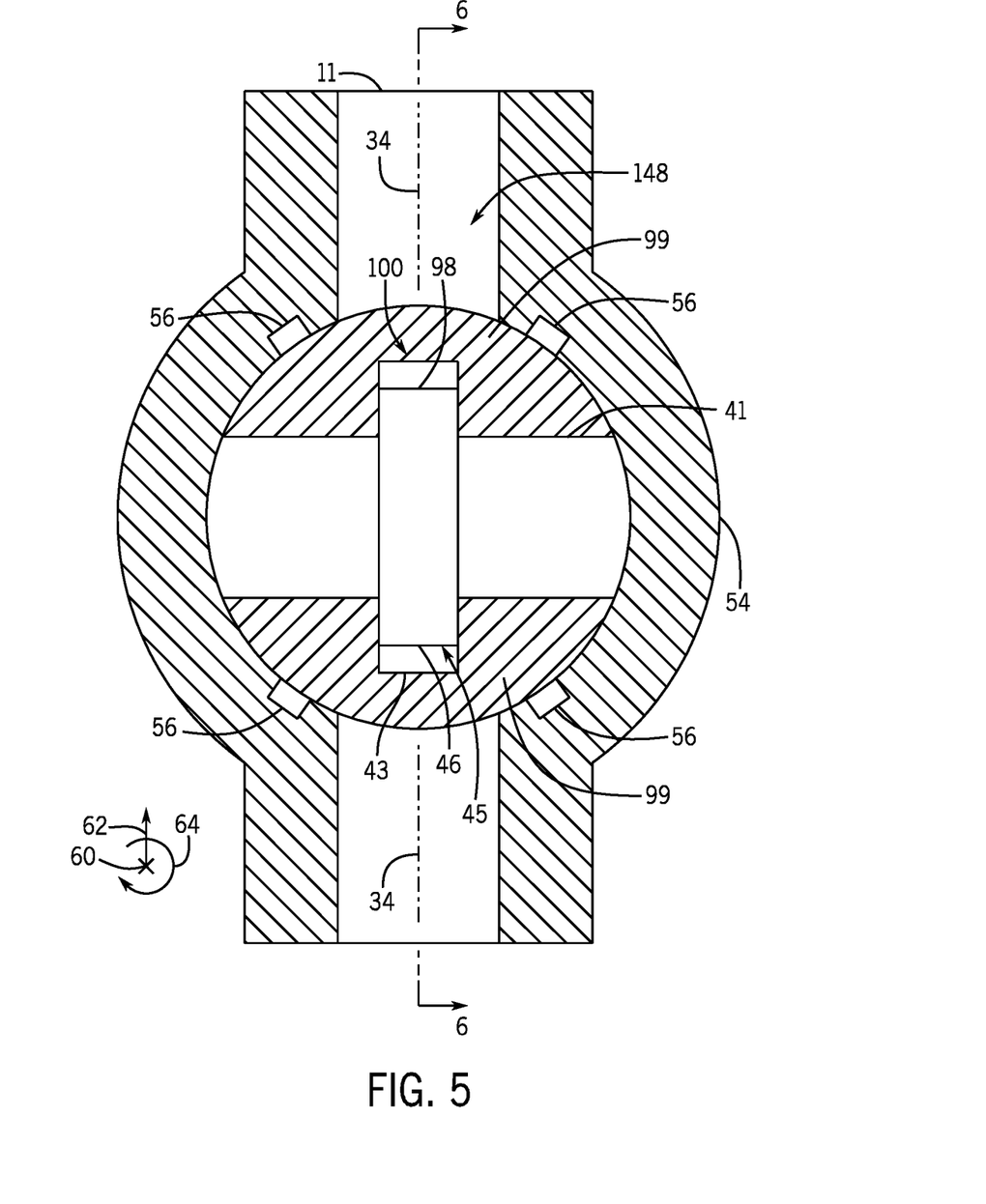
FIG. 5 is a cross-sectional view of an embodiment of the rotatable member along line 4-4 of FIG. 3, illustrating a closed position of the second rotation-operated BOP portion with the bore of the rotatable member out of alignment with the main central bore.

FIGS. 4 and 5 are cross-sectional side views of an embodiment of the BOP assembly 14 along line 4-4 of FIG. 3, in accordance with an embodiment of the present disclosure. In particular, FIG. 4 illustrates an open position of the second rotation-operated BOP portion 32 with the bore 41 of the inner cylinder 40 aligned with the wellbore 11, whereas FIG. 5 illustrates a closed position of the second rotation-operated BOP portion 32 with the bore 41 of the inner cylinder 40 out of alignment with the wellbore 11. As described above, the actuators 63 may be used to drive the inner cylinder 40 to rotate the inner cylinder 40 about its axis 47 crosswise (e.g., perpendicular) to the central axis 34 of the wellbore 11, such that the bore 41 of the inner cylinder 40 is selectively rotated in and out of alignment with the wellbore 11. As illustrated in FIG. 4, when the inner cylinder 40 (and the rams 45 carried in the ram slot 43) is rotated by the actuators 63 in the circumferential direction 64, a first point 97 of the ram 45 may be positioned at a first position 98. When the bore 41 of the inner cylinder 40 is aligned with the wellbore 11, the wellbore 11 is open and is not sealed along the axis 34. As illustrated in FIG. 5, when the inner cylinder 40 (and the rams 45 carried in the ram slot 43) is rotated by the actuators 63 in an opposite circumferential direction 64, the bore 41 is rotated out of alignment with the wellbore 11 while a structural portion 99 (e.g., first and second wall portions) completely blocks or covers the wellbore 11. After the inner cylinder 40 is rotated, the point 98 of the ram 45 may be positioned at a second position 100, as understood further with reference to FIG. 5. Thus, the structural portion 99 seals the wellbore 11 in the closed position of FIG. 5. In certain embodiments, the inner cylinder 40 may rotate approximately over an angular range of approximately 30, 45, 60, 75, 90, 105, 120, 135, 180, 270, or 360 degrees between open and closed positions. In the embodiment of FIGS. 4 and 5, the inner cylinder rotates approximately 90 degrees between the open and closed positions.

Figure 6:
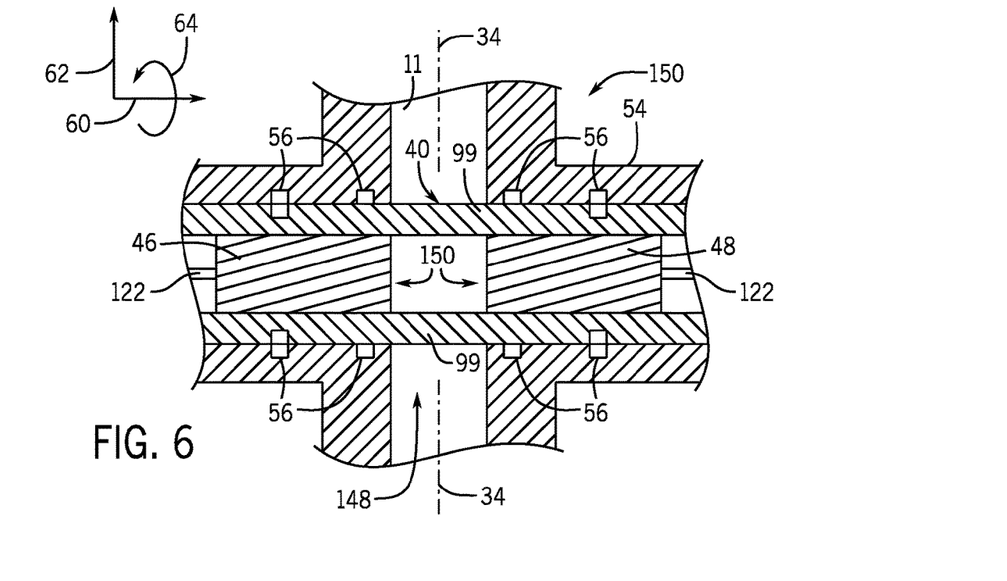
FIG. 6 is a partial cross-sectional side view of an embodiment of the BOP assembly, illustrating the first radial-operated BOP portion with the rams in an open position and the second rotation-operated BOP portion with the inner cylinder and its bore rotated into a closed position.

FIG. 6 is a partial cross-sectional side view of an embodiment of the BOP assembly 14, illustrating the first radial-operated BOP portion 30 with the rams 45 (e.g., 46 and 48) in an open position 150 and the second rotation-operated BOP portion 32 with the inner cylinder 40 and its bore 41 rotated into a closed position 148 with the structural portion 99 (e.g., first and second wall portions) blocking the wellbore 11. As illustrated, the inner cylinder 40 is disposed in the closed position 148 shown in FIG. 5, wherein the bore 41 is rotationally not aligned with the wellbore 11 and the structural portion 99 completely blocks the wellbore 11. For example, the inner cylinder 40 may be rotated in the circumferential direction 64 approximately 90 degrees from the open position 146 of FIG. 4 to the closed position 148 of FIGS. 5 and 6, such that the bore 41 in the inner cylinder 41 has its axis oriented crosswise (e.g., perpendicular) to the central axis 34 of the wellbore 11. The inner cylinder 40 (e.g., via blockage by the structural portion 99) may then effectively seal the main bore 11 both axially below and axially above the wellbore 11. As described above, the sealing elements 56 disposed around the wellbore 11 may also help seal the path through the wellbore 11 by sealing against the groove 49 and the outer surface of the wellbore 11. In the illustrated embodiment, the rams 45 (e.g., 46 and 48) of the first radial-operated BOP portion 30 have been rotated within the ram slot 43 of the inner cylinder 40. The rams 45 (e.g., 46 and 48) are retracted to an open position 150 (e.g., full bore configuration), so that the rams 45 (e.g., 46 and 48) do not obstruct the wellbore 11.

Figure 7:
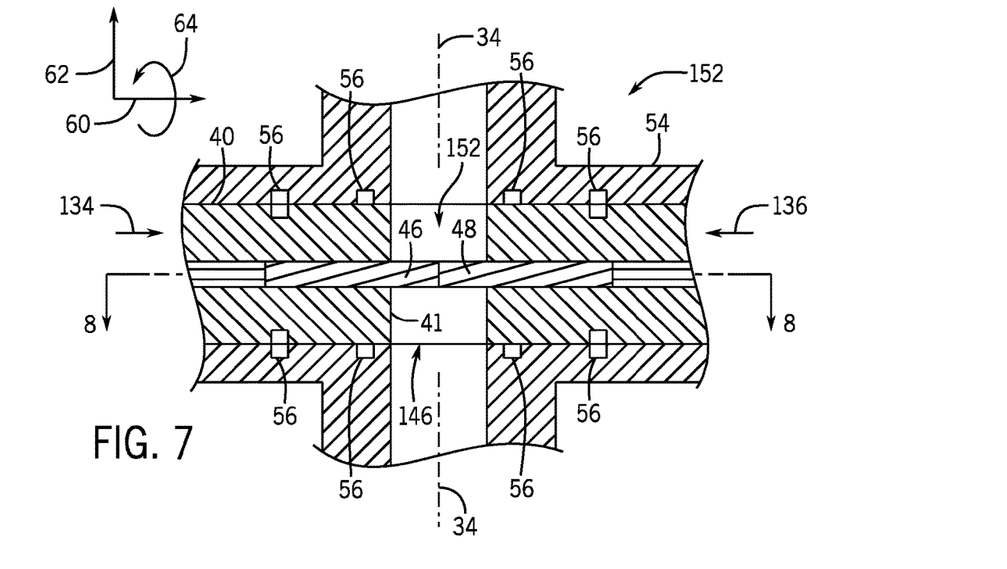
FIG. 7 is a partial cross-sectional side view of an embodiment of the BOP assembly, illustrating the first radial-operated BOP portion with the rams in a closed position and the second rotation-operated BOP portion with the inner cylinder and its bore rotated into an open position.

FIG. 7 is a partial cross-sectional side view of an embodiment of the BOP assembly 14, illustrating the first radial-operated BOP portion 30 with the rams 45 (e.g., 46 and 48) in a closed position 152 and the second rotation-operated BOP portion 32 with the inner cylinder 40 and its bore 41 rotated into an open position 146 with the bore 41 aligned (e.g., coaxial) with the wellbore 11. As illustrated, the inner cylinder 40 is disposed in the open position shown in FIG. 4, wherein the bore 41 is rotationally aligned with the wellbore 11 and the structural portion 99 is moved out of the wellbore 11. For example, the inner cylinder 40 may be rotated in the circumferential direction 64 approximately 90 degrees from the closed position 148 of FIGS. 5 and 6 to the open position 146 of FIGS. 4 and 7, such that the bore 41 in the inner cylinder 41 has its axis oriented substantially parallel (e.g., coaxial) to the central axis 34 of the wellbore 11. As further illustrated, the first radial-operated BOP portion 30 has the rams 45 (e.g., 46 and 48) moved linearly toward one another (i.e., radially inward) toward the central axis 34 of the wellbore 11, thereby closing off or blocking the wellbore 11. In particular, the first ram 46 has been extended in a first direction 134 along the axis 60, so that the first ram 46 obstructs at least part (e.g., approximately half) of the wellbore 11. Likewise, the second ram 48 has been extended in a second direction 136 (e.g., opposite the first direction 134) along the axis 60, so that the second ram obstructs at least part (e.g., approximately half) of the wellbore 11. In certain embodiments, the rams 45 (e.g., 46 and 48) may directly contact and seal against one another to close off the wellbore 11, and may shear through any structure (e.g., tubing) disposed in the wellbore 11. In some embodiments, the rams 45 (e.g., 46 and 48) may contact and seal against a structure (e.g., tubing) in the wellbore 11.

Figure 8:
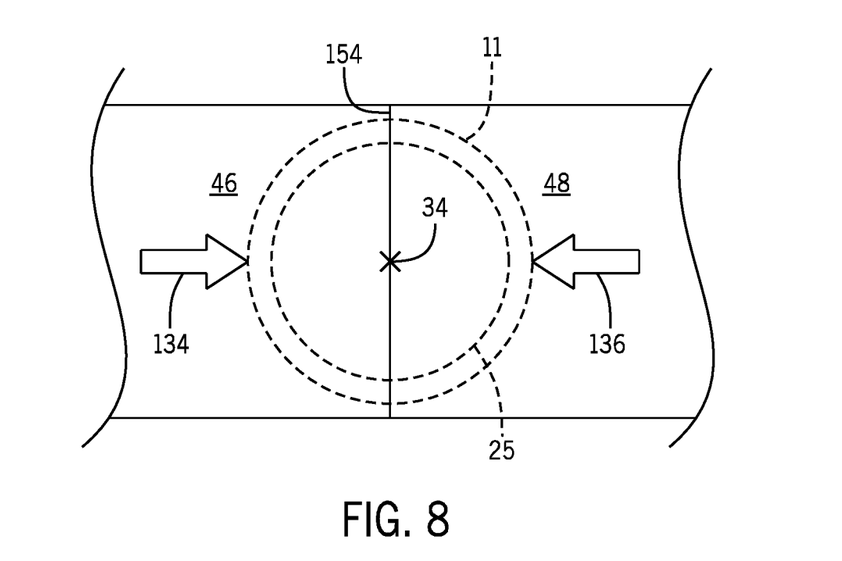
FIG. 8 is a cross-sectional view of an embodiment of the first radial-operated BOP portion of the BOP assembly, illustrating the rams along line 8-8 of FIG. 7, wherein the rams have straight edges that have sheared through a structure in a main central bore.

FIG. 8 is a cross-sectional view of an embodiment of the first radial-operated BOP portion 30 of the BOP assembly 14, illustrating the rams 45 (e.g., 46 and 48) along line 8-8 of FIG. 7. In the illustrated embodiment, each of the rams 45 (e.g. 46 and 48) has an inner ram surface 154 with a straight edge 155, such that the edges 155 contact one another to seal the wellbore 11. The edges 155 of the rams 45 also may have a sharp edge and/or tapered edge to facilitate shearing through any structure (e.g., tubing) disposed in the wellbore 11. As illustrated, the rams 45 have been actuated by the actuators 92 to move radially toward one another and the central axis 34 as indicated by arrows 134 and 136, thereby shearing through a structure 25 (e.g., string, tubing, pipe, drill pipe, coiled tubing, production tubing, etc.) and sealing off the wellbore 11.

Figure 9:
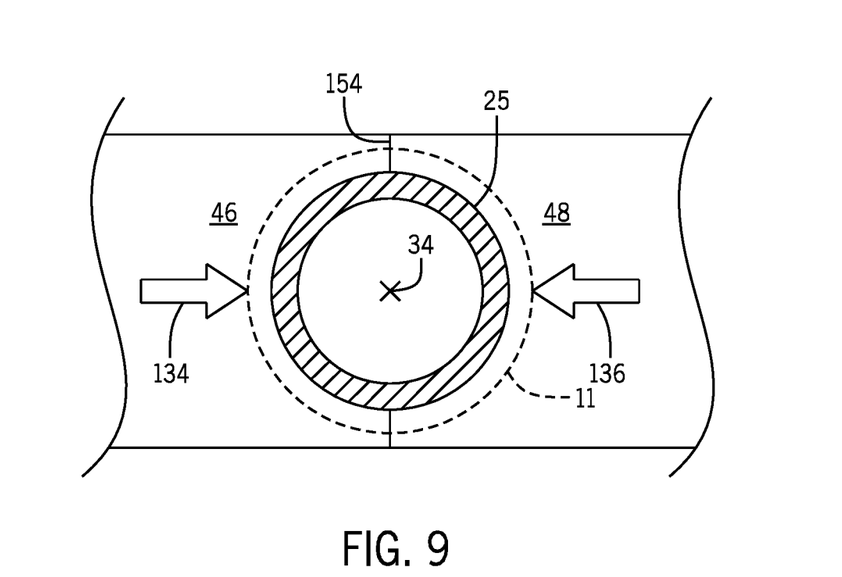
FIG. 9 is a cross-sectional side view of an embodiment of the first radial-operated BOP portion of the BOP assembly, illustrating the rams along line 8-8 of FIG. 7, wherein the rams have contoured edges sealed against an exterior contour of a structure in a main central bore.

FIG. 9 is a cross-sectional side view of an embodiment of the first radial-operated BOP portion 30 of the BOP assembly 14, illustrating the rams 45 (e.g., 46 and 48) along line 8-8 of FIG. 7. In the illustrated embodiment, each of the rams 45 (e.g. 46 and 48) has the inner ram surface 154 with a contoured edge 156, such that the edges 156 seal against a structure 25 (e.g., tubing) extending lengthwise through the wellbore 11. The edges 155 of the rams 45 may be contoured to match an exterior contour 158 of the structure 25 (e.g., tubing), such that the inner ram surfaces 154 and the exterior contour 158 are substantially parallel with one another. As illustrated, the rams 45 have been actuated by the actuators 92 to move radially toward one another and the structure 25 as indicated by arrows 134 and 136, thereby sealing against the structure 25 (e.g., string, tubing, pipe, drill pipe, coiled tubing, production tubing, etc.) and sealing off the wellbore 11.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a blowout preventer (BOP) assembly, comprising:
a first BOP portion comprising one or more rams configured to move between a first open position and a first closed position relative to a central bore, wherein the one or more rams intersect and seal the central bore in the first closed position;
a second BOP portion comprising an inner cylinder with a bore, wherein the inner cylinder is configured to rotate about an axis crosswise to the central bore to move between a second open position with the bore aligned with the central bore and a second closed position with the bore out of alignment with the central bore;
wherein the one or more rams of the first BOP portion are at least partially disposed within the inner cylinder of the second BOP portion at least while the second BOP portion is in the second open position.

2. The system of claim 1, wherein the one or more rams comprise a first ram and a second ram positioned opposite the first ram, and each of the first ram and the second ram are configured to move toward one another to intersect the central bore to reach the first closed position and to move away from one another and out of the central bore to reach the first open position.

3. The system of claim 2, wherein the first and second BOP portions are disposed in a nested arrangement in which the first ram and the second ram are disposed entirely within the inner cylinder of the second BOP portion at least while the first BOP portion is in the first open position and the second BOP portion is in the second open position.

4. The system of claim 1, wherein the one or more rams of the first BOP portion are disposed in a ram slot in the inner cylinder of the second BOP portion, and the one or more rams and the ram slot comprise corresponding non-circular cross-sectional shapes.

5. The system of claim 4, wherein the one or more rams are not sealed against the ram slot of the inner cylinder.

6. The system of claim 1, wherein the inner cylinder is disposed inside an outer housing, and one or more seals are disposed between and seal against the inner cylinder and the outer housing, thereby enabling the second BOP portion to seal the central bore in the second closed position.

7. The system of claim 6, wherein the BOP assembly comprises opposite first and second cap assemblies coupled to opposite openings in the outer housing.

8. The system of claim 1, comprising a drive shaft coupled to one ram of the one or more rams, and at least one actuator coupled to the drive shaft, wherein the at least one actuator is configured to drive linear movement of the drive shaft and the one ram within the inner cylinder.

9. The system of claim 8, wherein the at least one actuator is configured to drive rotation of the drive shaft, the one ram interfaces with a ram slot formed in the inner cylinder via a torque transfer interface, and the rotation of the drive shaft causes rotation of the one ram and rotation of the inner cylinder via the torque transfer interface.

10. The system of claim 1, wherein at least one first actuator is coupled to the one or more rams, and at least one second actuator is coupled to the inner cylinder.

11. The system of claim 10, wherein the first and second actuators comprise an electric actuator, a fluid-driven actuator, a mechanical actuator, or a combination thereof.

12. The system of claim 1, comprising a control system coupled to one or more actuators of the first and second BOP portions, wherein the control system is configured to selectively operate the one or more actuators to open and close the first and second BOP portions via a linear motion and a rotational motion, respectively, alone or in combination with one another.

13. The system of claim 12, wherein the control system is configured to selectively operate the one or more actuators to close the first and second BOP portions and shear through a structure in the central bore via the linear motion and the rotational motion, respectively, alone or in combination with one another.

14. A system, comprising:
a blowout preventer (BOP) assembly, comprising:
a rotation-operated BOP portion comprising an inner cylinder with a bore, wherein the inner cylinder is configured to rotate about an axis crosswise to the central bore to move between an open position with the bore aligned with the central bore and a closed position with the bore out of alignment with the central bore, wherein the rotation-operated BOP portion seals the central bore and blocks a flow of fluid through the central bore in the closed position;
wherein the BOP assembly comprises a radial-operated BOP portion comprising a first ram and a second ram positioned opposite the first ram, wherein each of the first ram and the second ram are configured to move within the inner cylinder toward one another to intersect the central bore to reach a respective closed position in which the first ram and the second ram seal the central bore and block the flow of fluid through the central bore and to move within the inner cylinder away from one another and out of the central bore to reach a respective open position.

15. The system of claim 14, comprising a control system coupled to one or more actuators of the rotation-operated BOP portion, wherein the control system is configured to selectively operate the one or more actuators to open and close the rotation-operated BOP portion via a rotational motion, and the rotational motion is configured to cause the inner cylinder to shear through a structure disposed in the central bore.

16. The system of claim 14, wherein the inner cylinder comprises a solid structural portion that covers the central bore in the closed position, the BOP assembly comprises one or more annular seals that seal between the inner cylinder and an outer housing of the BOP assembly, and the solid structural portion and the one or more annular seals enable the rotation-operated BOP portion to seal the central bore and to block the flow of fluid through the central bore in the closed position.

17. A method, comprising:
sealing a central bore of a blowout preventer (BOP) assembly by actuating an inner cylinder of a rotation-operated of the BOP assembly to rotate about an axis crosswise to the central bore to move from an open position with a bore of the inner cylinder aligned with the central bore to a closed position with the bore out of alignment with the central bore;

wherein sealing the central bore comprises actuating a first ram and a second ram of a radial-operated BOP portion of the BOP assembly to move within the inner cylinder toward one another from a respective open position to a respective closed position, wherein the first ram and the second ram are positioned outside of the central bore in the respective open position and contact one another at a location within the central bore to form a seal across the central bore in the respective closed position.

18. The method of claim 17, comprising selectively operating one or more actuators to close the rotation-operated BOP portion via a rotational motion of the inner cylinder from the open position to the closed position, wherein the rotational motion causes the inner cylinder to shear through a structure disposed in the central bore.

* * * * *